United States Patent
Sakuramata et al.

(10) Patent No.: US 8,976,119 B2
(45) Date of Patent: Mar. 10, 2015

(54) ELECTRONIC DISPLAY BOARD APPARATUS, METHOD OF CONTROLLING ELECTRONIC DISPLAY BOARD APPARATUS, AND ELECTRONIC DISPLAY BOARD APPARATUS CONTROL SYSTEM

(71) Applicants: Yoshifumi Sakuramata, Kanagawa (JP); Kuangyi Zhu, Kanagawa (JP)

(72) Inventors: Yoshifumi Sakuramata, Kanagawa (JP); Kuangyi Zhu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 278 days.

(21) Appl. No.: 13/711,741

(22) Filed: Dec. 12, 2012

(65) Prior Publication Data
US 2013/0154946 A1    Jun. 20, 2013

(30) Foreign Application Priority Data
Dec. 15, 2011    (JP) .................................. 2011-274736

(51) Int. Cl.
G06F 3/02      (2006.01)
G06F 1/16      (2006.01)
G06F 3/0488    (2013.01)

(52) U.S. Cl.
CPC ............ *G06F 3/0227* (2013.01); *G06F 1/1601* (2013.01); *G06F 3/04886* (2013.01)
USPC ........... 345/172; 345/173; 715/700; 715/705; 715/730; 715/808

(58) Field of Classification Search
CPC ... G06F 3/04886; G06F 3/0482; G06F 3/044; G06F 3/041
USPC .................. 715/700, 705, 730, 808
See application file for complete search history.

(56) References Cited

U.S. PATENT DOCUMENTS

| | | | |
|---|---|---|---|
| 2011/0298722 A1* | 12/2011 | Tse et al. | 345/173 |
| 2012/0032976 A1 | 2/2012 | Nagahara et al. | |
| 2012/0050197 A1 | 3/2012 | Kemmochi | |
| 2012/0062591 A1 | 3/2012 | Omura et al. | |

(Continued)

FOREIGN PATENT DOCUMENTS

| JP | 2005-031842 | 2/2005 |
|---|---|---|
| JP | 2008-097371 | 4/2008 |

OTHER PUBLICATIONS

U.S. Appl. No. 13/677,934, filed Nov. 15, 2012, Sakuramata et al.

(Continued)

*Primary Examiner* — Lixi C Simpson
(74) *Attorney, Agent, or Firm* — IPUSA, PLLC

(57) ABSTRACT

An electronic display board apparatus configured to provide an operation key, includes a display with a touch panel function on which an application image is displayed; a mode change accepting unit which accepts an operation mode for the touch panel function, the operation mode including a simple operation mode; an image analyzing unit which detects an operational image associated with an operational function from the application image displayed on the display at the simple operation mode; a key allocation unit which allocates the operation key to the operational image detected by the image analyzing unit so that an operation of the allocated operation key is treated as an operation to the operational image at the simple operation mode; and a touch panel control unit which suppresses the touch panel function of at least a part where the operational image is displayed at the simple operation mode.

13 Claims, 19 Drawing Sheets

(56) References Cited

U.S. PATENT DOCUMENTS

| | | |
|---|---|---|
| 2012/0192078 A1* | 7/2012 | Bai et al. .................. 715/740 |
| 2012/0206387 A1 | 8/2012 | Omura et al. |
| 2012/0235934 A1 | 9/2012 | Kawasaki et al. |
| 2013/0207910 A1* | 8/2013 | Chiu ........................ 345/173 |

OTHER PUBLICATIONS

U.S. Appl. No. 13/688,617, filed Nov. 29, 2012, Omura.

* cited by examiner

FIG.4

| MODE FLAG | SKIP FLAG | MODE |
|---|---|---|
| EABLED | DISABLED | OPERATION MODE |
| DISABLED | DISABLED | WRITING MODE |
| DISABLED | DISABLED | SIMPLE OPERATION MODE |

| PHYSICAL OPERATION KEY NAME | KEY ALLOCATION NUMBER | ... |
|---|---|---|
| 126b | KEY ALLOCATION #1 | ... |
| 126c | KEY ALLOCATION #2 | ... |
| 126d | KEY ALLOCATION #3 | ... |
| ... | ... | ... |

| COORDINATE | KEY ALLOCATION NUMBER | ... |
|---|---|---|
| XXX,XXX | KEY ALLOCATION #1 | ... |
| XXX,XXX | KEY ALLOCATION #2 | ... |
| XXX,XXX | KEY ALLOCATION #3 | ... |
| ... | ... | ... |

| SELECTION FLAG | APPLICATION NAME | KEY ALLOCATION #1 | KEY ALLOCATION #2 | KEY ALLOCATION #3 | KEY ALLOCATION #4 | ... |
|---|---|---|---|---|---|---|
| EABLED | POWER POINT | CHANGE LINE | PAGE DOWN | BACK SPACE | PAGE UP | ... |
| DISABLED | WORD | NEXT PAGE | PAGE DOWN | PREVIOUS PAGE | PAGE UP | ... |
| DISABLED | ORIGINAL SOFTWARE | NEXT BUTTON (SINGLE CLICK) | LOWER BUTTON (SINGLE CLICK) | PREVIOUS BUTTON (SINGLE CLICK) | UPPER BUTTON (SINGLE CLICK) | ... |
| ... | ... | ... | ... | ... | ... | ... |

| APPLICATION NAME | TEMPLATE IMAGE DATA #1 | SEARCH AREA COORDINATE #1 | TEMPLATE IMAGE DATA #2 | SEARCH AREA COORDINATE #2 | TEMPLATE IMAGE DATA #3 | SEARCH AREA COORDINATE #3 | ... |
|---|---|---|---|---|---|---|---|
| POWER POINT | D1 | D2 | D3 | D4 | D5 | D6 | ... |
| WORD | D7 | D8 | D9 | D10 | ... | ... | ... |
| ORIGINAL SOFTWARE | D11 | D12 | D13 | D14 | ... | ... | ... |
| ... | ... | ... | ... | ... | ... | ... | ... |

| OPERATIONAL FUNCTION NAME | POINT COORDINATE | ACTION KIND |
|---|---|---|
| NEXT BUTTON | (1500,20) | SINGLE CLICK |
| PREVIOUS BUTTON | (1400,20) | SINGLE CLICK |
| UPPER BUTTON | (1600,1200) | SINGLE CLICK |
| LOWER BUTTON | (1600,1300) | SINGLE CLICK |
| ... | ... | ... |

230

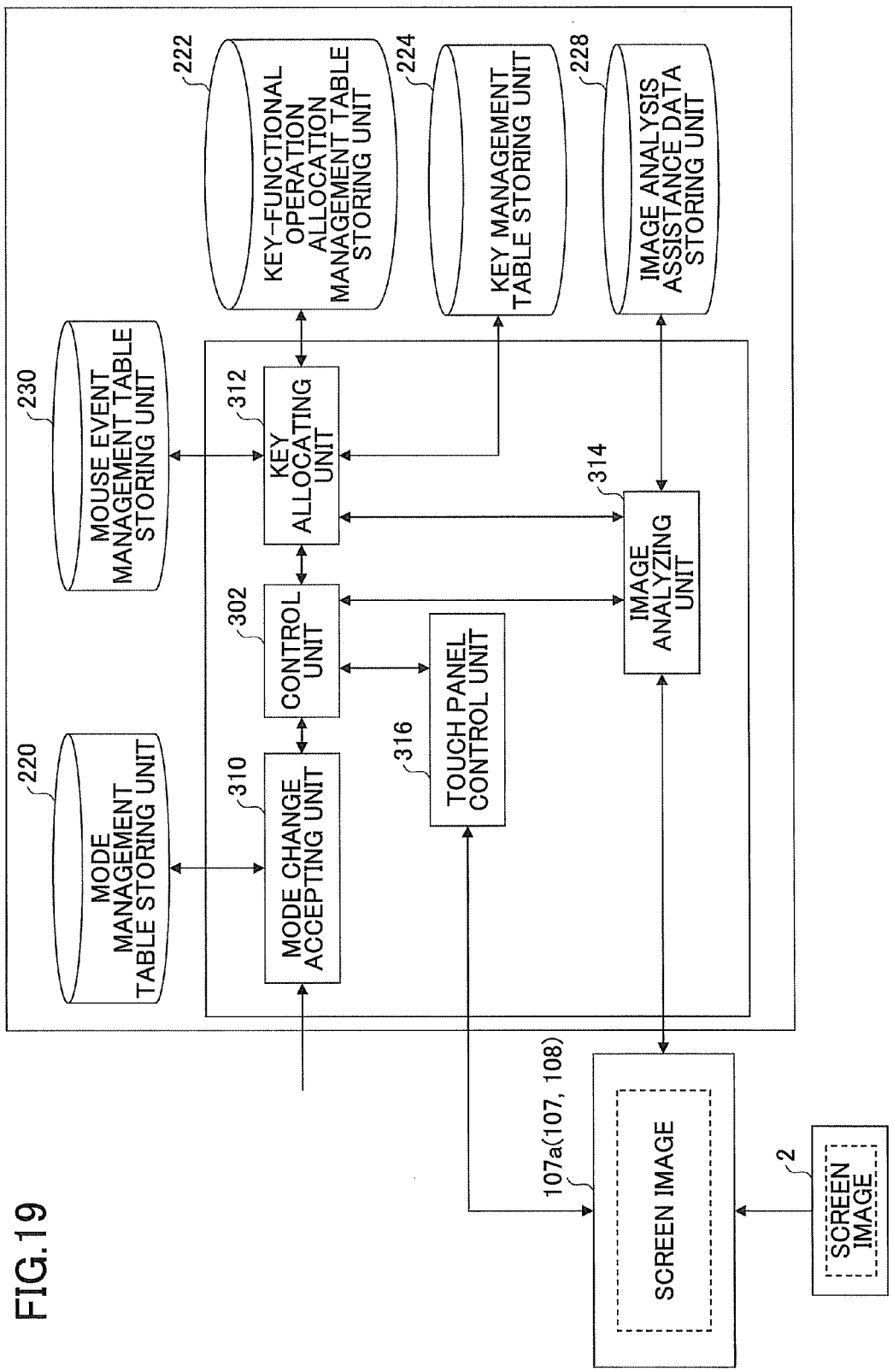

ELECTRONIC DISPLAY BOARD APPARATUS, METHOD OF CONTROLLING ELECTRONIC DISPLAY BOARD APPARATUS, AND ELECTRONIC DISPLAY BOARD APPARATUS CONTROL SYSTEM

BACKGROUND OF THE INVENTION

1. Field of the Invention

The present invention relates to an electronic display board apparatus.

2. Description of the Related Art

An electronic display board apparatus has been commercially available with a large size display such as a liquid crystal display, a plasma display or the like, a coordinate detection unit such as a touch panel or the like that detects a position (a coordinate) at which a pen or a finger touches, and an interface unit for an external terminal device such as a personal computer or the like.

Such an electronic display board apparatus includes functions as follows:
- a function of displaying a screen image of a terminal device which is connected to the electronic display board apparatus or content which is stored in a server on a network in an enlarged manner,
- a function of operating the terminal device by a movement of a pen or a finger using a touch panel function,
- a function of inputting and displaying handwriting by the movement of the pen or the finger using the touch panel function, like a whiteboard, and the like.

Such an electronic display board apparatus is often used for presentations or the like as it is possible to enlarge a screen image of a terminal device connected to the electronic display board apparatus so that plural people can see the screen image at a conference room or the like.

Further, in contrast with a case when a projector which projects a screen image on a wall is used, as the display of the electronic display board apparatus itself is bright, it is unnecessary to make the room dark. Thus, participants can easily see paper documents or the like at hand, take memos or the like while viewing the screen image of the electronic display board apparatus.

Further, as the electronic display board apparatus includes the touch panel function, it is possible to operate the terminal device which outputs the displayed screen image by directly touching the display (a touch panel) of the electronic display board apparatus instead of operating a mouse or a keyboard of the terminal device. Thus, a presenter is able to perform a presentation and operation of the terminal device near the electronic display board apparatus even when the presenter is far from the terminal device.

However, as described above, as it is possible to directly operate the terminal device via the electronic display board apparatus, an erroneous operation may occur by touching the touch panel while performing the presentation, for example. For example, there may be various erroneous operations such as a case where the screen image is moved to an unexpected position, a case where the screen image is deleted, or the like, by touching the touch panel by a hand or clothes, or the like.

In order to prevent such erroneous operations, a method of prohibiting the touch panel function may be adopted.

However, if the touch panel function is prohibited, although the above described erroneous operations can be prevented, as might be expected, the function of operating the terminal device and the function of inputting and displaying the handwriting by the movement of the pen or the finger cannot be achieved. Thus, in order to use the touch panel function, it is necessary to release the prohibition of the touch panel function every time. This is onerous for a user. Further, if the prohibition of the touch panel function is still existing, another user who wants to use the touch panel function may assume that the function has broken down.

Further, as the size of the display of the electronic display board apparatus is becoming larger and larger and the size of the screen image also becomes large, it is hard for a user to touch a part (an operational icon or the like) of the screen image which is displayed on the display of the electronic display board apparatus at the other side from the operator, for example.

Patent Document 1 discloses a method of setting a limited area (coordinate) only for which the touch panel function is enabled in order to prevent erroneous operations when performing a presentation by an electronic display board apparatus. The limited area is set based on the application and data of the limited area is registered in a terminal device. Then, when the respective application is displayed on the electronic display board apparatus, the data of the limited area is sent to the electronic display board apparatus so that the touch panel function is limited.

However, in such a method, it is necessary to previously set and register the limited area in the terminal device for each of the applications. Further, when the resolution or displayed area of the electronic display board apparatus is changed, the previously registered limited area may not be enabled.

Patent Document 2 discloses a method of applying a limitation to an area of a touch panel of an electronic display board apparatus.

However, it is necessary to perform a setting for each of applications to be used, and the problem of difficulty in operating the large size display still remains.

PATENT DOCUMENT

[Patent Document 1] Japanese Laid-open Patent Publication No. 2008-097371

[Patent Document 2] Japanese Laid-open Patent Publication No. 2005-031842

SUMMARY OF THE INVENTION

The present invention is made in light of the above problems, and provides an electronic display board apparatus capable of operating the minimum operation in accordance with a displayed application while preventing operational errors.

According to an embodiment, there is provided an electronic display board apparatus configured to provide an operation key, including a display with a touch panel function on which an application image is displayed; a mode change accepting unit which accepts an operation mode for the touch panel function, the operation mode including a simple operation mode; an image analyzing unit which detects an operational image associated with an operational function from the application image displayed on the display at the simple operation mode; a key allocation unit which allocates the operation key to the operational image detected by the image analyzing unit so that an operation of the allocated operation key is treated as an operation to the operational image at the simple operation mode; and a touch panel control unit which suppresses the touch panel function of at least a part where the operational image is displayed at the simple operation mode.

According to another embodiment, there is provided a method of controlling an electronic display board apparatus configured to provide an operation key and including a display with a touch panel function on which an application image is displayed, including, accepting an operation mode for the touch panel function, the operation mode including a simple operation mode; detecting an operational image associated with an operational function from the application image displayed on the display at the simple operation mode; allocating the operation key to the detected operational image at the simple operation mode; and suppressing the touch panel function of at least a part where the operational image is displayed at the simple operation mode; and treating an operation of the allocated operation key as an operation to the operational image at the simple operation mode.

According to another embodiment, there is provided an electronic display board apparatus control system for controlling an electronic display board apparatus configured to provide an operation key and including a display with a touch panel function on which an application image is displayed, including, a mode change accepting unit which accepts an operation mode for the touch panel function, the operation mode including a simple operation mode; an image analyzing unit which detects an operational image associated with an operational function from the application image displayed on the display at the simple operation mode; a key allocation unit which allocates the operation key to the operational image detected by the image analyzing unit so that an operation of the allocated operation key is treated as an operation to the operational image at the simple operation mode; and a touch panel control unit which suppresses the touch panel function of at least a part where the operational image is displayed at the simple operation mode.

Note that also arbitrary combinations of the above-described constituents, and any exchanges of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 4 is a view showing an example of a mode management table;

FIG. 5A is a view showing an example of a key allocation management table for physical operation keys;

FIG. 5B is a view showing an example of a key allocation management table for software operation keys;

FIG. 6 is a view showing an example of a key-functional operation allocation management table;

FIG. 7 is a view showing an example of image analysis assistance data;

FIG. 8 is a view showing an example of a mouse event management table;

FIG. 9 is a flowchart showing an example of an operation of the electronic display board apparatus when a power is on;

FIG. 10 is a flowchart showing an example of an operation of the electronic display board apparatus when a terminal device is connected to the electronic display board apparatus after the power is on;

FIG. 11 is a flowchart showing an example of an operation of the electronic display board apparatus when the terminal device is disconnected from the electronic display board apparatus after the power is on;

FIG. 19 is a block diagram showing an example of a functional structure of the electronic display board apparatus of the embodiment.

DETAILED DESCRIPTION OF THE PREFERRED EMBODIMENTS

Figure 1:
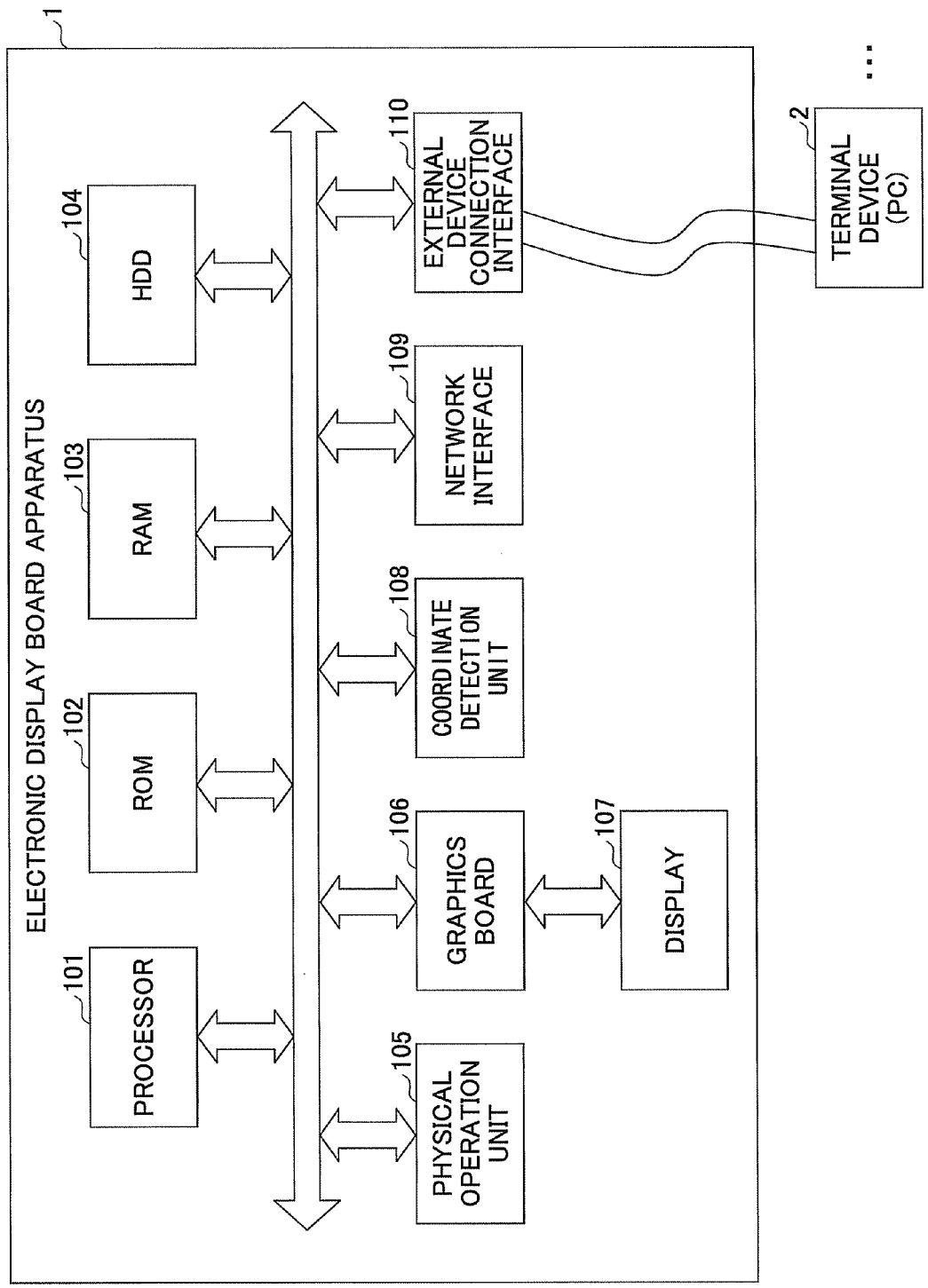
FIG. 1 is a block diagram showing an example of a structure of an electronic display board apparatus.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

In this embodiment, an electronic display board apparatus with a touch panel function is used. Then, the electronic display board apparatus is configured to perform a "simple operation mode" as an operation mode for the touch panel function when performing a presentation or the like while displaying an enlarged screen image (application image) output from a terminal device which is connected to the electronic display board apparatus on a display of the electronic display board apparatus.

At this time, the following operation is performed.

When the screen image is displayed on the display of the electronic display board apparatus, an operational mark (icon, operational image) associated with a functional operation, which is operable by a touch using the touch panel function, within the screen image is selectively detected. Then, an operation key of the electronic display board apparatus is allocated to the operational function of the detected operational mark so that the terminal device is operated by the operation of the allocated operation key while limiting the touch panel function of the electronic display board apparatus.

At this time, the touch panel function of at least a part where the operational mark is displayed may be limited. Alternatively, the touch panel function of at least a part where the screen image is displayed may be limited.

Here, the operation key of the electronic display board apparatus may be a physical key of the electronic display board apparatus or a software (electronic) operation key which is displayed on the display (touch panel) of the electronic display board apparatus. When the operation key is the software operation key, the touch panel function of the electronic display board apparatus is limited to be enabled only within an area where the software operation key is displayed.

Plural operation keys, which are positioned to be close to each other, of the electronic display board apparatus may be allocated to plural operational functions of plural operational marks, the minimum operational functions, for example, respectively. With this structure, an operator of the electronic display board apparatus is capable of performing the minimum operational functions, for example, by operating the operation keys which are positioned to be close to each other. Thus, even when the display of the electronic display board apparatus becomes large, it is easy for the operator to perform the functional operations.

When the software operation keys are used, the software operation keys may be displayed at a position near the operator so that the operator can easily touch the software operation keys.

(Structure)

FIG. 1 is a block diagram showing an example of a structure of an electronic display board apparatus 1.

The electronic display board apparatus 1 includes a processor 101, a ROM 102, a RAM 103, a HDD 104, a physical operation unit 105, a graphics board 106, a display 107, a coordinate detection unit 108, a network interface 109, and an external device connection interface 110.

The processor 101 is an arithmetical unit (control unit 302) which calculates processes performed by the electronic display board apparatus 1. The processor 101 may be selected from various processers including a CPU such as PENTIUM (registered trademark), Athlon and the like, MPU and the like.

The ROM 102 is a non-volatile memory in which a boot program such as BIOS or the like is stored.

The RAM 103 is a volatile memory or a non-volatile memory which provides an executing area for the processor 101 to process programs. The processor 101 actualizes functional units, which will be explained later, of the electronic display board apparatus 1 by performing programs written by a programmable language such as assembler, C, C++, Java (registered trademark), Java (registered trademark) Script, PERL, RUBY, PYTHON or the like under a control of an OS.

The HDD 104 is a large volume non-volatile memory. The HDD 104 stores an OS which controls the entirety of the electronic display board apparatus 1. The OS may be selected from various OSs such as WINDOWS (registered trademark) series, UNIX (registered trademark), LINUX (registered trademark), Android (registered trademark), ITRON, iITRON and the like. The HDD 104 further stores various data such as programs for processing main processes such as device drivers of the graphics board 106, the display 107, the coordinate detection unit 108 or the like. The programs for processing main processes may be provided in a computer readable recording medium such as a CD-ROM, a MO, a flexible disk, an EEPROM, an EPROM or the like and installed, or may be provided via a network and installed.

The physical operation unit 105 includes plural physical (hardware) keys operable by a user, provided on the outer periphery of a housing of the electronic display board apparatus 1.

The graphics board 106 includes connector terminals to be connected to a VRAM which stores the image data and the display 107, respectively. The graphics board 106 processes image data to be displayed on the display 107.

The display 107 displays the image data processed by the graphics board 106.

The coordinate detection unit 108 detects a touch or a contact of an object such as a pen or a finger. For the coordinate detection unit 108, a touch panel including a capacitance sensor which detects a change of an electric capacity by the touch or the contact of the object, or a touch panel including a pressure sensor which detects a contacted pressure by the touch or the contact of the object may be used. Alternatively, for the coordinate detection unit 108, an optical detection device which detects approaching or contacting of an object by detecting that lights exposed in a direction parallel to a surface of the display 107, or lights exposed in a vertical direction and a lateral direction with respect to the surface of the display 107 are intercepted. With the function of the coordinate detection unit 108 in cooperation with other components of the electronic display board apparatus 1 such as the processor 101, the display 107, and the like, the electronic display board apparatus 1 is configured to have a touch panel function.

The network interface 109 is an interface for connecting the electronic display board apparatus 1 with an external network. The network interface 109 is a physical interface such as a LAN cable connector, a modular cable connector, or the like.

The external device connection interface 110 is an interface for connecting the electronic display board apparatus 1 with a terminal device 2 such as a PC or the like. The external device connection interface 110 is a physical interface such as a VGA input connector, a USB port or the like. The external device connection interface 110 is configured to be capable of connecting plural of the terminal devices 2. Further, the external device connection interface 110 may be configured to connect the terminal device 2 with the electronic display board apparatus 1 by radio communication, such as WiFi or the like.

Figure 2:
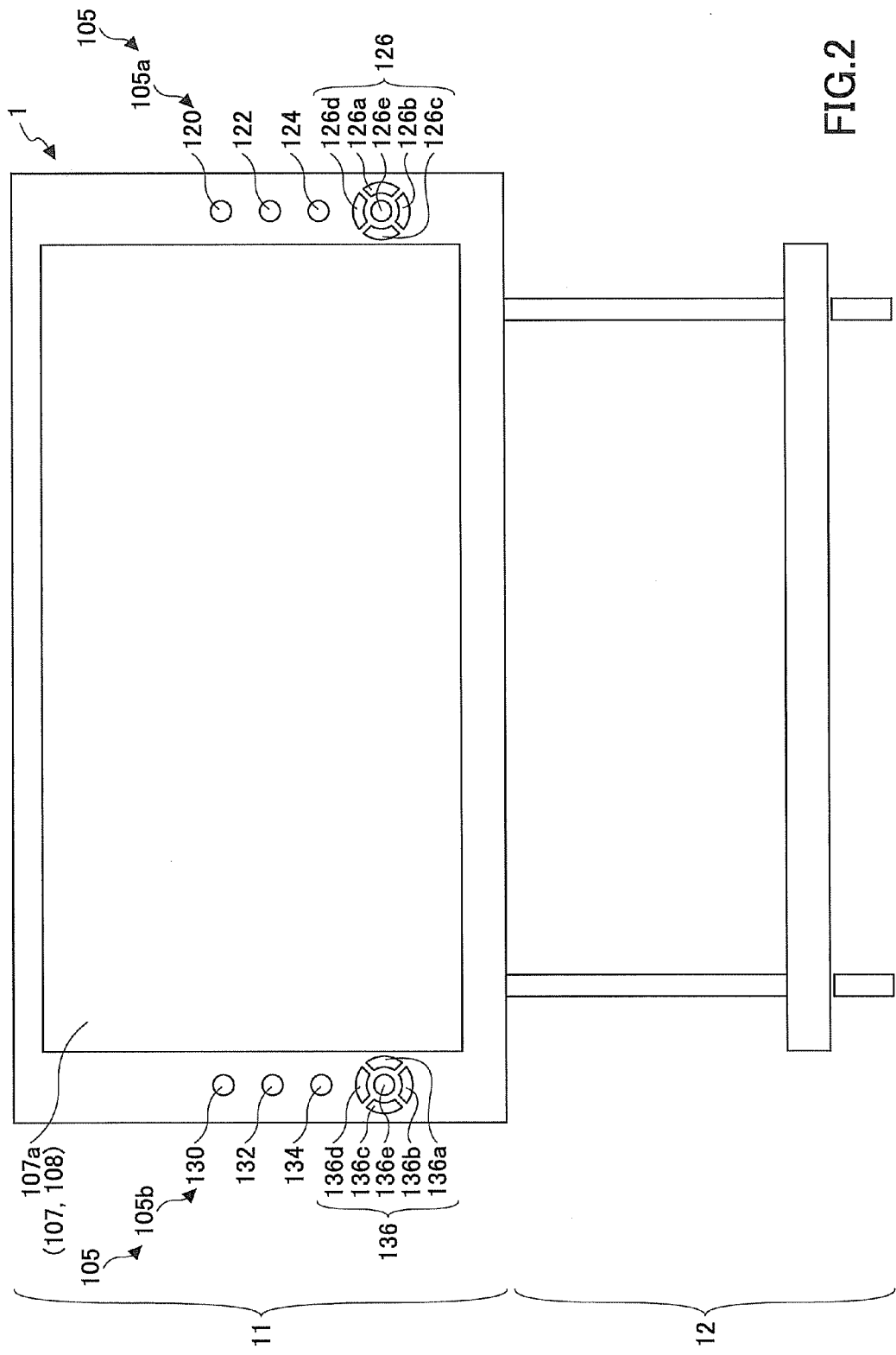
FIG. 2 is a schematic view showing an example of an appearance of the electronic display board apparatus.

FIG. 2 is a schematic view showing an example of an appearance of the electronic display board apparatus 1.

The electronic display board apparatus 1 includes a main body portion 11 and a pedestal portion 12. The electronic display board apparatus 1 includes a touch panel 107a, which is structured by the coordinate detection unit 108 and the display 107 at a front surface of the main body portion 11.

In this embodiment, the physical operation unit 105 includes physical operation units 105a and 105b provided at both sides of the main body portion 11, respectively. The physical units 105a and 105b include plural hardware keys (buttons).

Specifically, the physical operation unit 105a includes push buttons 120, 122 and 124, and a directional keypad 126 as physical operational keys. The directional keypad 126 includes push buttons 126a to 126e. Similarly, the physical operation unit 105b includes push buttons 130, 132 and 134, and a directional keypad 136 as physical operational keys. The directional keypad 136 includes buttons 136a to 136e. The physical operation unit 105a and the physical operation unit 105b are symmetrical with each other.

In this embodiment, as will be explained later, one of the button of each of the physical operation units 105a and 105b, the topmost push buttons 120 and 130, for example, is allocated as a mode change button for changing modes. Alternatively, a button of a pen operated by a user may be allocated as the mode change button.

Figure 3:
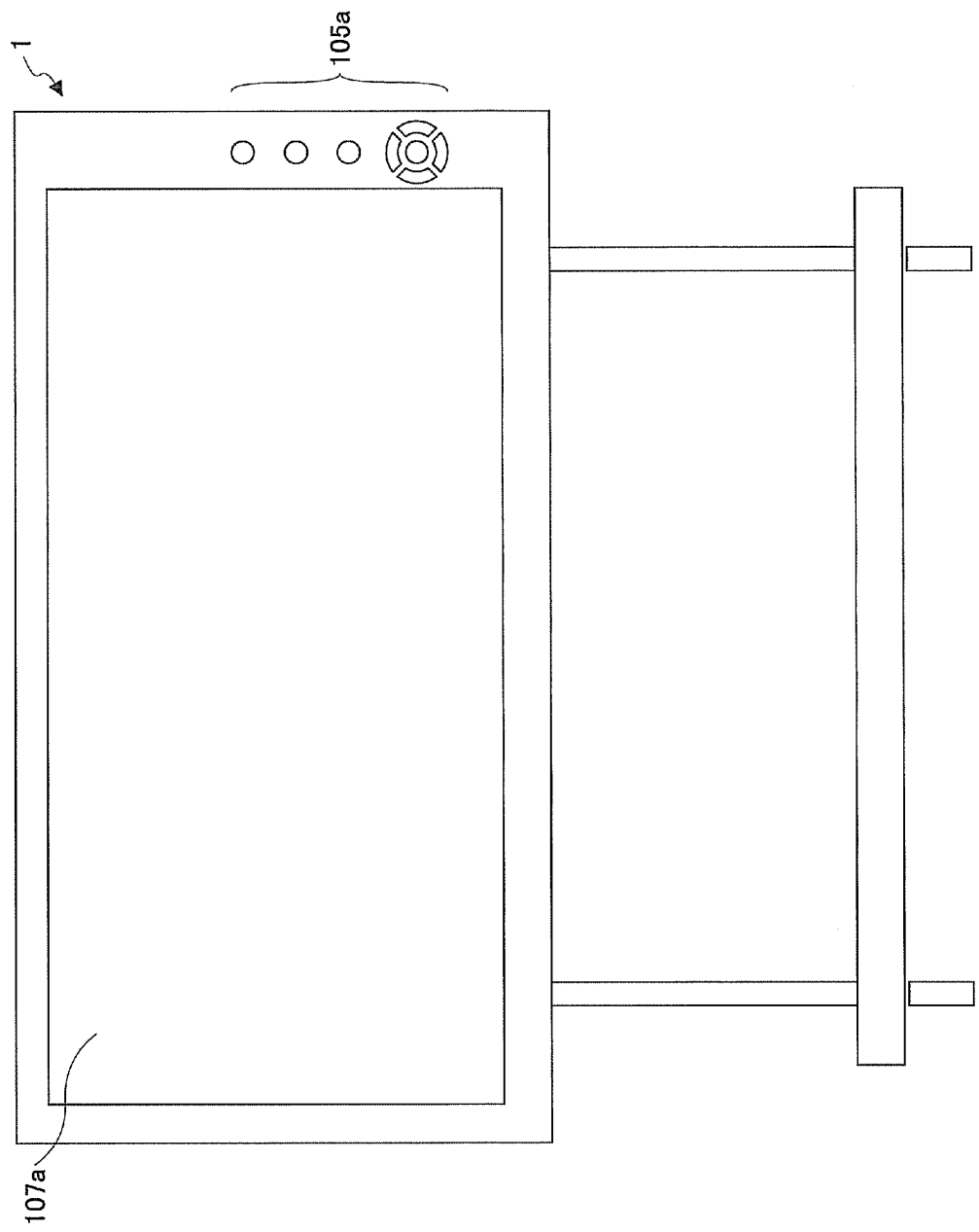
FIG. 3 is a schematic view showing another example of an appearance of the electronic display board apparatus.

FIG. 3 is a schematic view showing another example of an appearance of the electronic display board apparatus 1. In this case, the physical operation unit 105 only includes the physical operation unit 105a provided at one side of the main body portion 11.

FIG. 19 is a block diagram showing an example of a functional structure of the electronic display board apparatus 1 of the embodiment.

The electronic display board apparatus 1 includes a control unit 302, a mode change accepting unit 310, a key allocating unit 312, a touch panel control unit 316 and an image analyzing unit 314 as the functional units. These functional units may be actualized by the processor 101. The electronic display board apparatus 1 further includes a mode management table storing unit 220, a key-functional operation allocation management table storing unit 222, a key management table storing unit 224, an image analysis assistance data storing unit 228, and a mouse event management table storing unit 230. These storing units are actualized by the HDD 104 or the like.

FIG. 4 to FIG. 8 are views showing an example of data used in the main processes of the electronic display board apparatus 1 of the embodiment.

FIG. 4 is a view showing an example of a mode management table stored in the mode management table storing unit 220.

The mode management table is used for managing modes of the touch panel function of the electronic display board apparatus 1.

The mode management table includes items such as "mode flag", "skip flag", and "mode".

The "mode" is the type of mode. In this embodiment, "operation mode", "writing mode", and "simple operation mode" are included for the modes. The "operation mode" is a mode in which the terminal device 2 is controlled by touching the touch panel 107a of the electronic display board apparatus 1. The "writing mode" is a mode in which a character or an image written by handwriting or the like is input and displayed on the touch panel 107a. Further, in the "writing mode" the electronic display board apparatus 1 is controlled by touching the touch panel 107a.

As explained above, the "simple operation mode" is a kind of protection mode in which the operation keys of the electronic display board apparatus 1 are allocated to the minimum operational functions for operating the terminal device 2 (the application displayed on the display 107), respectively, while the touch panel function of the touch panel 107a is partially limited.

The "mode flag" is data indicating whether the corresponding mode is enabled or disabled. Thus, only one of the modes is set to be "enabled".

The "skip flag" is data indicating whether the corresponding mode is to be skipped when changing the modes. As will be explained later, when the mode change button is pushed by the operator, the mode is changed to the next mode. In this embodiment, there are three modes. Thus, for the mode which may not be selected, the "skip flag" is set to be "enabled". For example, when the terminal device 2 is not connected to the electronic display board apparatus 1, the "operation mode" and the "simple operation mode" may not be selected. Thus, as will be explained later, the "skip flag" of the "operation mode" and the "simple operation mode" are set to be "enabled" at this time. With this operation, the modes can be changed between frequently-used modes.

In the simple operation mode, the operation keys of the electronic display board apparatus 1, which are provided at a position where the operator can easily operate, are allocated to the minimum operational functions for operating the terminal device 2 (the application displayed on the display 107).

In other words, these operation keys of the electronic display board apparatus 1 are configured to have operational functions different from their original operational functions, respectively. The operation keys to be allocated to the minimum operational functions for operating the terminal device 2 (the application displayed on the display 107) in the "simple operation mode" are referred to as "simple operation keys" hereinafter.

FIG. 5A is a view showing an example of a physical operation key allocation management table stored in the key management table storing unit 224.

The physical operation key allocation management table includes items such as "physical operation key name", "key allocation number", and the like.

The "physical operation key name" indicates the physical operation key of the electronic display board apparatus 1 which is to function as the simple operation key. The "key allocation number" indicates the number of the simple operation key.

Here, for explanatory purposes, the numerals of the push buttons as shown in FIG. 2 or FIG. 3 are shown as the "physical operation key name".

For example, the push buttons 126b, 126c, and 126d are allocated as "key allocation #1", "key allocation #2", and "key allocation #3", respectively.

Further, the simple operation keys may include software operation keys which are displayed on the touch panel 107a of the electronic display board apparatus 1 in addition to the push buttons of the physical operation unit 105 of the electronic display board apparatus 1.

For example, when the electronic display board apparatus 1 includes only the physical operation unit 105a provided at the one side of the touch panel 107a as shown in FIG. 3, if an operator (presenter) would like to stand by a side opposite to the side where the physical operation unit 105a is provided while performing a presentation, the operator cannot operate the physical operation unit 105a. Thus, in such a case, software operation keys are displayed on the touch panel 107a as the simple operation keys.

Figure 13:
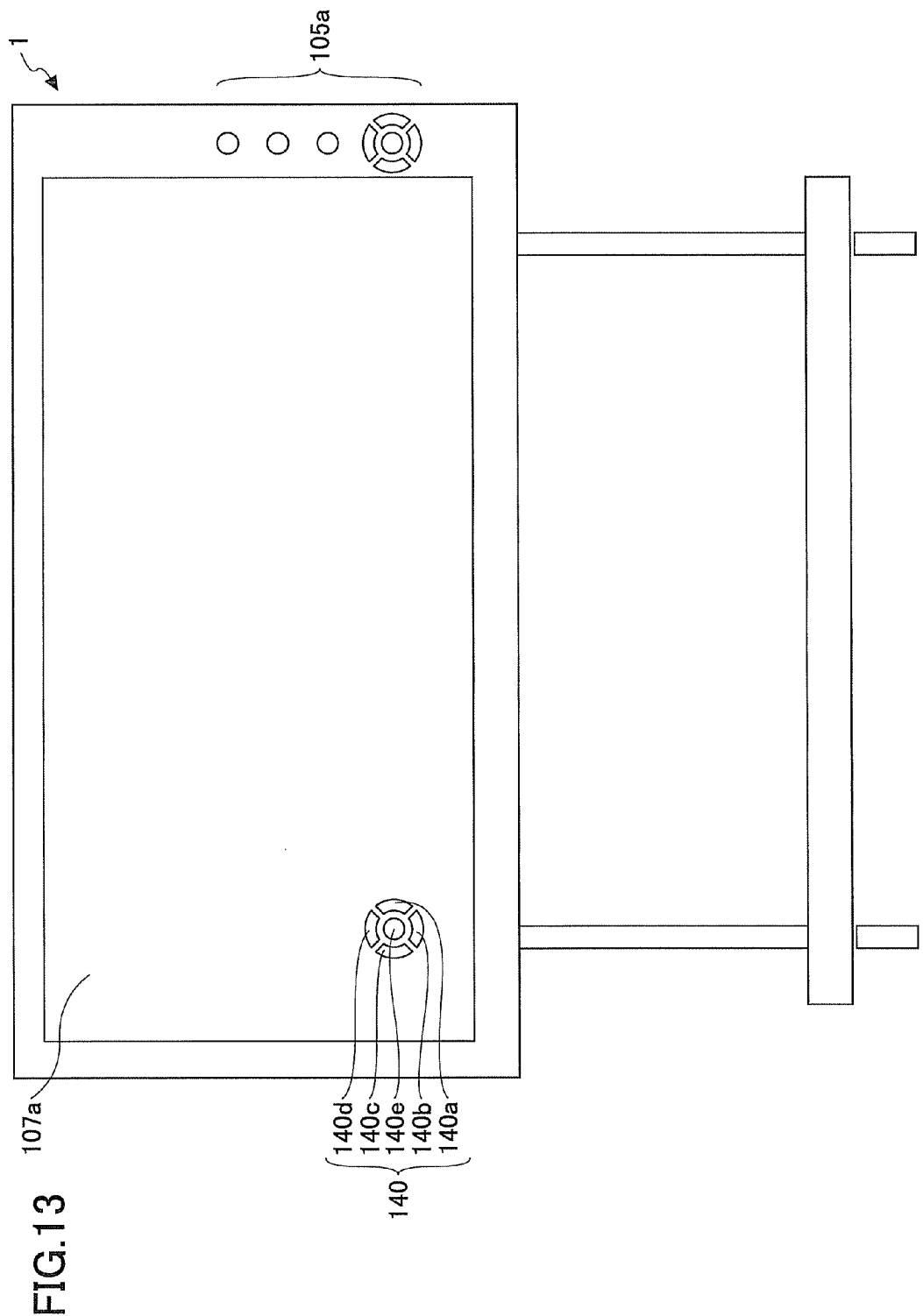
FIG. 13 is a schematic view showing an example of an appearance of the electronic display board apparatus with a software operation unit.

FIG. 13 is a view showing an example of a software operation unit 140 including plural software operation keys 140a to 140e displayed on the touch panel 107a of the electronic display board apparatus 1. The software operation unit 140 may be displayed at a side of the touch panel 107a where the physical operation unit 105a is not provided when the electronic display board apparatus 1 is provided only with the physical operation unit 105a at one side. Alternatively, the software operation unit 140 may be displayed only when it is detected that the operator is standing at the side of the touch panel 107a where the physical operation unit 105a is not provided.

Further, even when the physical operation unit 105a and the physical operation unit 105b are provided at both side of the touch panel 107a as shown in FIG. 2, the software operation keys may be additionally provided.

FIG. 5B is a view showing an example of a software operation key allocation management table stored in the key management table storing unit 224.

The software operation key allocation management table includes items such as "software key coordinate", "key allocation number", and the like.

The "software key coordinate" indicates a coordinate on the touch panel 107a of the respective software operation key displayed on the touch panel 107a. The coordinate may be a center position of the respective software operation key.

The operational functions for operating the terminal device 2 for operation the respective application may be varied based on the kind of the application which is displayed on a display of the terminal device 2 as well as being displayed on the touch panel 107a of the electronic display board apparatus 1. Thus, in this embodiment, the operational functions to be allocated to the simple operation keys are previously determined based on the kind of application which is displayed on the touch panel 107a.

FIG. 6 is a view showing an example of a key-functional operation allocation management table stored in the key-functional operation allocation management table storing unit 222.

In the key-functional operation allocation management table, the operational functions are in correspondence with simple operation keys of the electronic display board apparatus 1 for the each of the applications. In this embodiment, the minimum operational functions of each of the applications correspond with the simple operation keys of the electronic display board apparatus 1.

The key-functional operation allocation management table includes items such as "selection flag", "application name", "correspondence between operational function and key allocation number", and the like.

The "application name" indicates a name of the application for specifying the corresponding application.

The "correspondence between operational function and key allocation number" includes correspondences between the number of the simple operation key "key allocation #1", "key allocation #2", . . . , and the operational functions, respectively.

The "selection flag" is data indicating whether the corresponding application is specified as the kind of application of the application which is displayed on the touch panel 107a.

Here, for an application "power point", operation functions "change line", "page down", "back space", "page up", and the like are in correspondence with "key allocation #1", "key allocation #2", "key allocation #3", "key allocation #4", and the like, respectively. Similarly, for an application "word", operation functions "next page", "page down", "previous page", "page up", and the like are in correspondence with "key allocation #1", "key allocation #2", "key allocation #3", "key allocation #4", and the like, respectively.

Further similarly, for an application "original software", "next button (single click)", operation functions "lower button (single click)", "previous button (single click)", "upper button (single click)", and the like are in correspondence with "key allocation #1", "key allocation #2", "key allocation #3", "key allocation #4", and the like, respectively.

It is assumed that the operational functions "change line", "page down", "back space", "page up", "next page", and "previous page" are key codes of keyboard events.

On the other hand, it is assumed that the operational functions "next button (single click)", "lower button (single click)", "previous button (single click)" and "upper button (single click)" are mouse events.

The mouse event is processed when the respective operational mark (icon) associated with the functional operation is clicked by a mouse or touched by the object when the touch panel function of the touch panel 107a is enabled. Thus, when the operational function of the mouse event is allocated to the simple operation key of the electronic display board apparatus 1, it is necessary to correspond the coordinate of the operational mark (icon) on the touch panel 107a, and an action (single click, double click or the like) with the respective simple operation key (via the key allocation number).

The image analyzing unit 314 searches and detects the operational mark (icon) from the screen image (application) displayed on the touch panel 107a to obtain the coordinate of the respective operational mark. The image analysis assistance data storing unit 228 stores image analysis assistance data for assisting the operation of the image analyzing unit 314.

FIG. 7 is a view showing an example of the image analysis assistance data stored in the image analysis assistance data storing unit 228.

The image analysis assistance data includes template images of the operational marks for each of the applications. Further, the image analysis assistance data may include search area coordinate data in correspondence with the operational marks indicating the coordinates of the respective operational marks, respectively.

Specifically, as shown in FIG. 7, the image analysis assistance data includes "application name" and plural sets of template image data of the operational marks such as "template image data #1", "template image data #2", . . . and the like in correspondence with the application name. The "application name" is the name of the application.

Further, in this embodiment, each of the sets of template image data is in correspondence with the search area coordinate data. The "template image data #1", "template image data #2", . . . and the like are in correspondence with "search area coordinate #1", "search area coordinate #2", . . . and the like, respectively.

Thus, the image analyzing unit 314 is capable of searching the search area of the screen image displayed on the touch panel 107a designated by the search area coordinate data to detect the respective template image data, which is the operational mark.

Further, the template image data may include template image data of a specific mark or the like which typically express the kind of the application, in addition to the operational mark. Thus, the image analyzing unit 314 is capable of detecting the kind of the application which is currently displayed on the touch panel 107a based on the detected specific mark.

Alternatively, the image analysis assistance data may not include the search area coordinate data, for example, when the operational marks and the specific mark are positioned at an upper end, a lower end, a left end and a right end of the screen image. In such a case, the image analyzing unit 314 may search the limited area (the upper end, the lower end, the left end and the right end) of the screen image.

FIG. 8 is a view showing an example of a mouse event management table stored in the mouse event management table storing unit 230.

The mouse event management table stores a correspondence between an operational function (operational function name), a point coordinate, and a kind of action (single click, double click or the like) for each of the operational functions when the operational function is the mouse event.

The mouse event management table includes items such as "operational function name" "point coordinate", "action kind", and the like.

The "operational function name" is the name of the operational function as shown in FIG. 6. The "point coordinate" is coordinate data of the operational mark of the mouse event on the touch panel 107a. The "point coordinate" is the center coordinate of the respective operational mark, for example. The "action kind" indicates a kind of action of the mouse event such as single click, double click or the like.

When the image analyzing unit 314 detects the operational mark from the screen image displayed on the touch panel 107a, the key allocating unit 312 obtains the corresponding operational function (the operational function name and the kind of action) associated with the detected operational mark.

Then, the image analyzing unit 314 stores the functional operation, the point coordinate of the operational mark, and the kind of action in correspondence with each other in the mouse event management table storing unit 230.

The mouse event management table may include the item "key allocation number", or the item "physical operation key name" or the item "coordinate" instead of or in addition to the item "operational function name".

(Operation)

Figure 9:
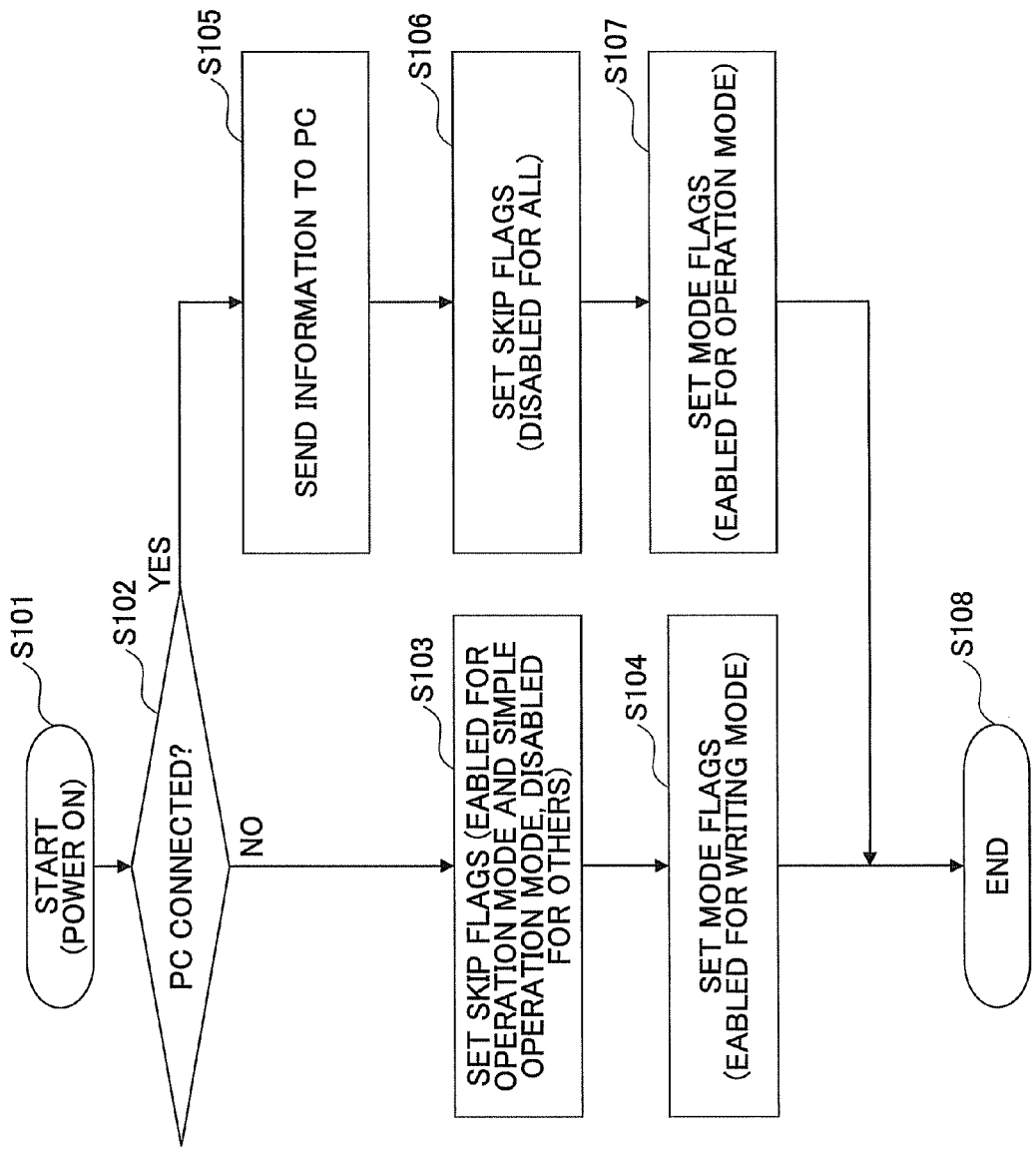

FIG. 9 is a flowchart showing an example of an operation of the electronic display board apparatus 1 when power is on.

In FIG. 9, when the power of the electronic display board apparatus 1 is on and the operation is started (step S101), the control unit 302 (processor 101) determines whether the terminal device 2 (PC) is connected to the electronic display board apparatus 1 based on whether a picture signal (video signal) from the terminal device 2 is detected, an establishment status of the USB, or the like (step S102).

When the terminal device 2 is not connected to the electronic display board apparatus 1, it is unnecessary to use the modes "operation mode" or "simple operation mode". Thus, when it is determined that the terminal device 2 is not connected (NO of step S102), the mode change accepting unit 310 sets "enabled" for the skip flags of the modes "operation mode" and "simple operation mode", and sets "disabled" for the skip flag of the other mode ("writing mode") in the mode management table storing unit 220 (see FIG. 4) (step S103).

Then, the mode change accepting unit 310 sets "enabled" for the mode flag of the mode "writing mode" and sets "disabled" for the mode flags of the other modes in the mode management table storing unit 220 (step S104), and ends the operation (step S108).

When it is determined that the terminal device 2 is connected (YES of step S102), the control unit 302 sends information indicating that the electronic display board apparatus 1 is a composite device of a keyboard and a mouse to the terminal device 2 (step S105). Upon receiving the information, the terminal device 2 recognizes the electronic display board apparatus 1 as the composite device and reads a standard driver for the composite device stored in the terminal device 2 to perform setting.

Then, the mode change accepting unit 310 sets "disabled" for the skip flags of all of the modes in the mode management table storing unit 220 (step S106).

Then, the mode change accepting unit 310 sets "enabled" for the mode flag of the mode "operation mode", for example and sets "disabled" for the mode flags of the other modes in the mode management table storing unit 220 (step S107), and ends the operation (step S108).

When the terminal device 2 is connected to the electronic display board apparatus 1, it may be appropriate to enable the operation mode so that the terminal device 2 can be operated by touching the touch panel 107a of the electronic display board apparatus 1. Thus, the "operation mode" is set to be enabled as an initial status. Alternatively, other modes may be set to be enabled as the initial status.

Figure 10:
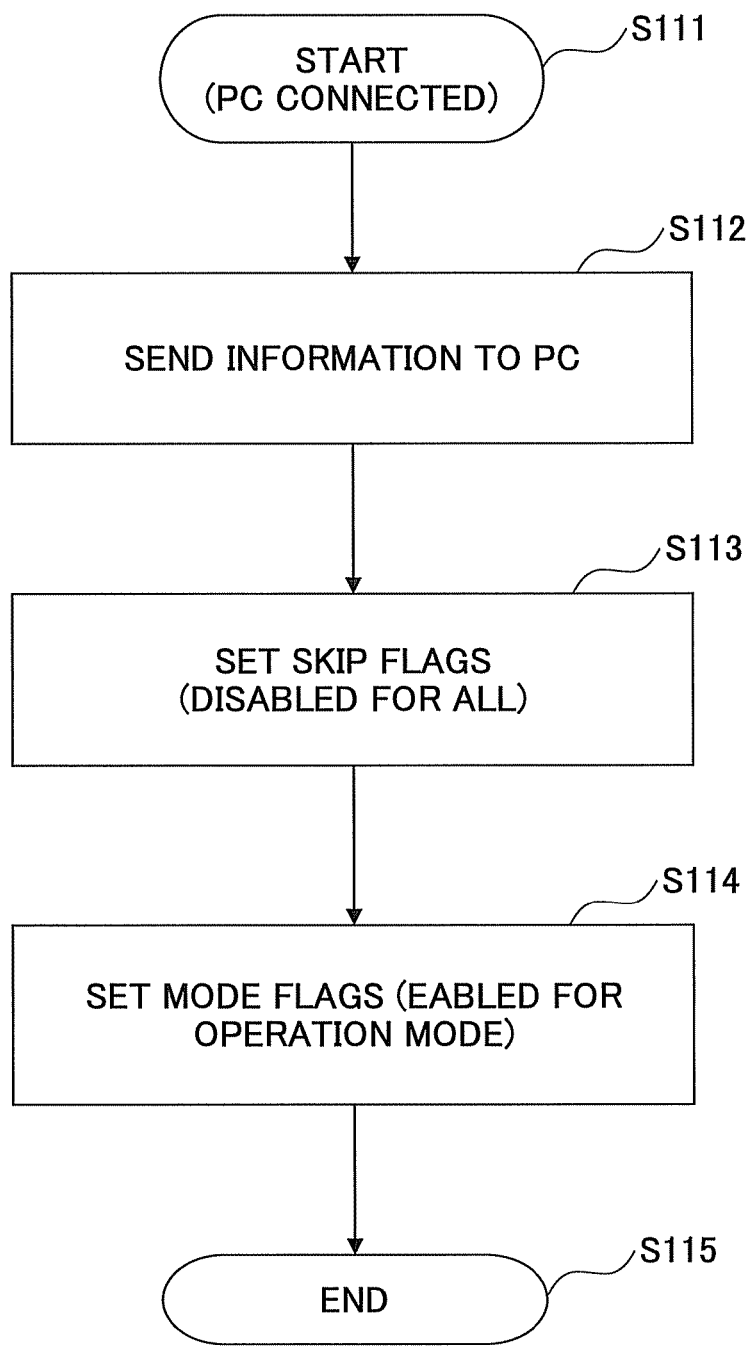

FIG. 10 is a flowchart showing an example of an operation of the electronic display board apparatus 1 when the terminal device 2, which has not been connected, is connected to the electronic display board apparatus 1 after the power is on.

In FIG. 10, when the control unit 302 detects the connection of the terminal device 2, the operation is started (step S111). Then, the control unit 302 sends information indicating that the electronic display board apparatus 1 is a composite device of a keyboard and a mouse to the terminal device 2 (step S112).

Then, the mode change accepting unit 310 sets "disabled" for the skip flags of all of the modes in the mode management table storing unit 220 (step S113).

Then, the mode change accepting unit 310 sets "enabled" for the mode flag of the mode "operation mode", for example, and sets "disabled" for the mode flags of the other modes in the mode management table storing unit 220 (step S114), and ends the operation (step S115).

Figure 11:
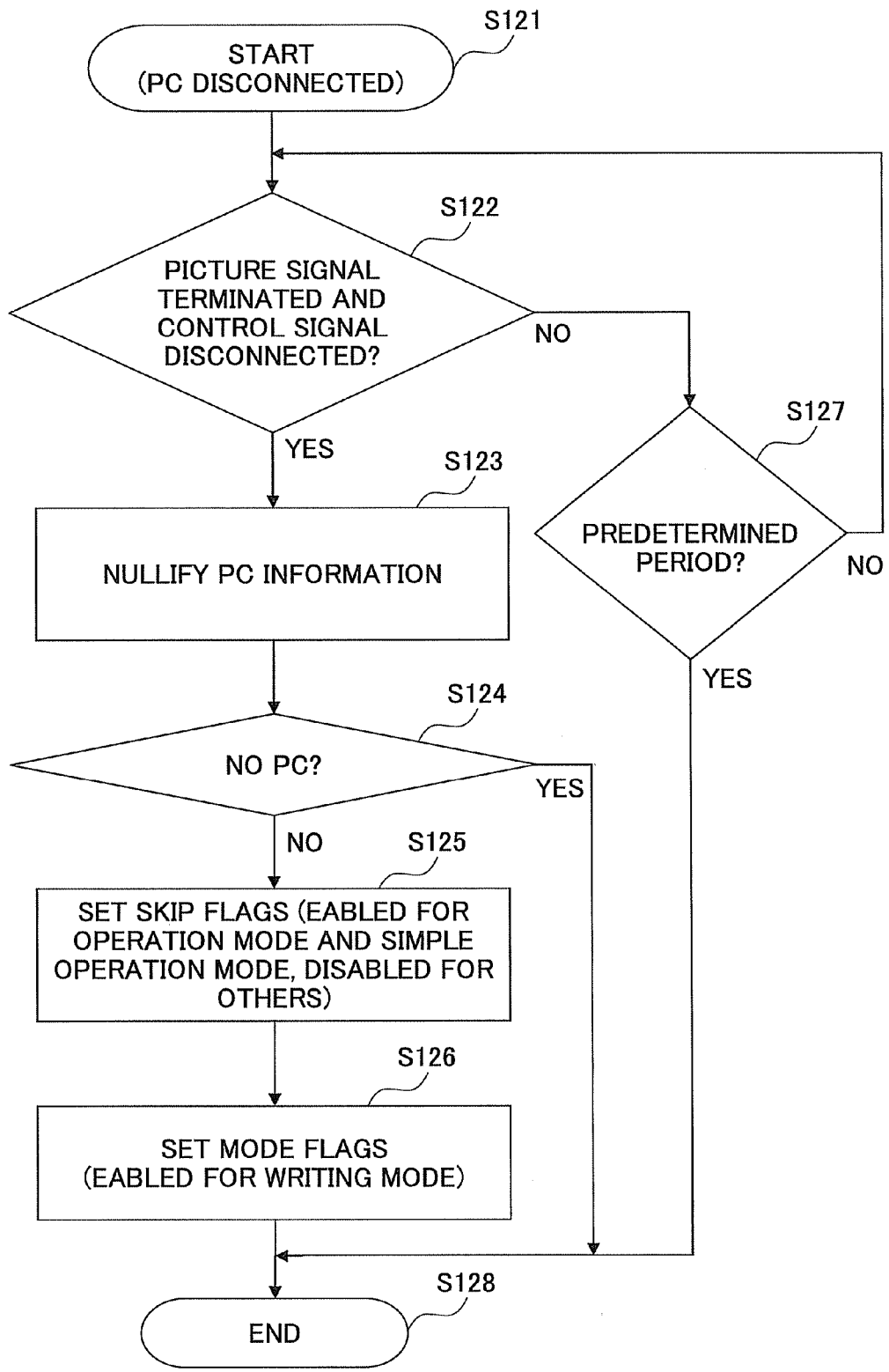

FIG. 11 is a flowchart showing an example of an operation of the electronic display board apparatus 1 when the terminal device 2, which has been connected, is disconnected from the electronic display board apparatus 1 after the power is on.

In FIG. 11, when the control unit 302 detects the disconnection of the terminal device 2 by detecting the disconnection of the picture signal, the USB link or the like, the operation is started (step S121). Then, the control unit 302 determines whether the picture signal is terminated as well as the control signal by the USB link or the like is disconnected (step S122).

When it is determined that the picture signal is terminated as well as the control signal is disconnected (YES of step S122), the control unit 302 determines that the terminal device 2 is disconnected and nullifies information about the terminal device 2 (step S123).

Then, the control unit 302 determines whether any other terminal device 2 is connected (step S124).

When no other terminal device 2 is connected (NO of step S124), the mode change accepting unit 310 sets "enabled" for the skip flags of the modes "operation mode" and "simple operation mode", and sets "disabled" for the skip flag of the other mode ("writing mode") in the mode management table storing unit 220 (step S125).

Then, the mode change accepting unit 310 sets "enabled" for the mode flag of the mode "writing mode", and sets "disabled" for the mode flags of the other modes in the mode management table storing unit 220 (step S126), and ends the operation (step S128).

When it is determined that at least one of the terminal devices 2 is connected (YES of step S124), the control unit 302 ends the operation without changing settings of modes (step S128).

On the other hand, when it is determined that the picture signal is not terminated as well as the control signal is not disconnected (NO of step S122), the control unit 302 determines whether a predetermined period has passed (step S127). Until the predetermined period has passed (NO of step S127), the operation of step S122 is repeated. Then, unless it is determined that the picture signal is terminated as well as the control signal is disconnected by the predetermined period has passed (YES of step S127), the control unit 302 ends the operation without changing settings of modes (step S128). When the picture signal is not terminated as well as the control signal is not disconnected, an error such as the connection cable is temporarily pulled out or the like may occur. Thus, in such a case, the setting of modes is not changed.

Figure 12:
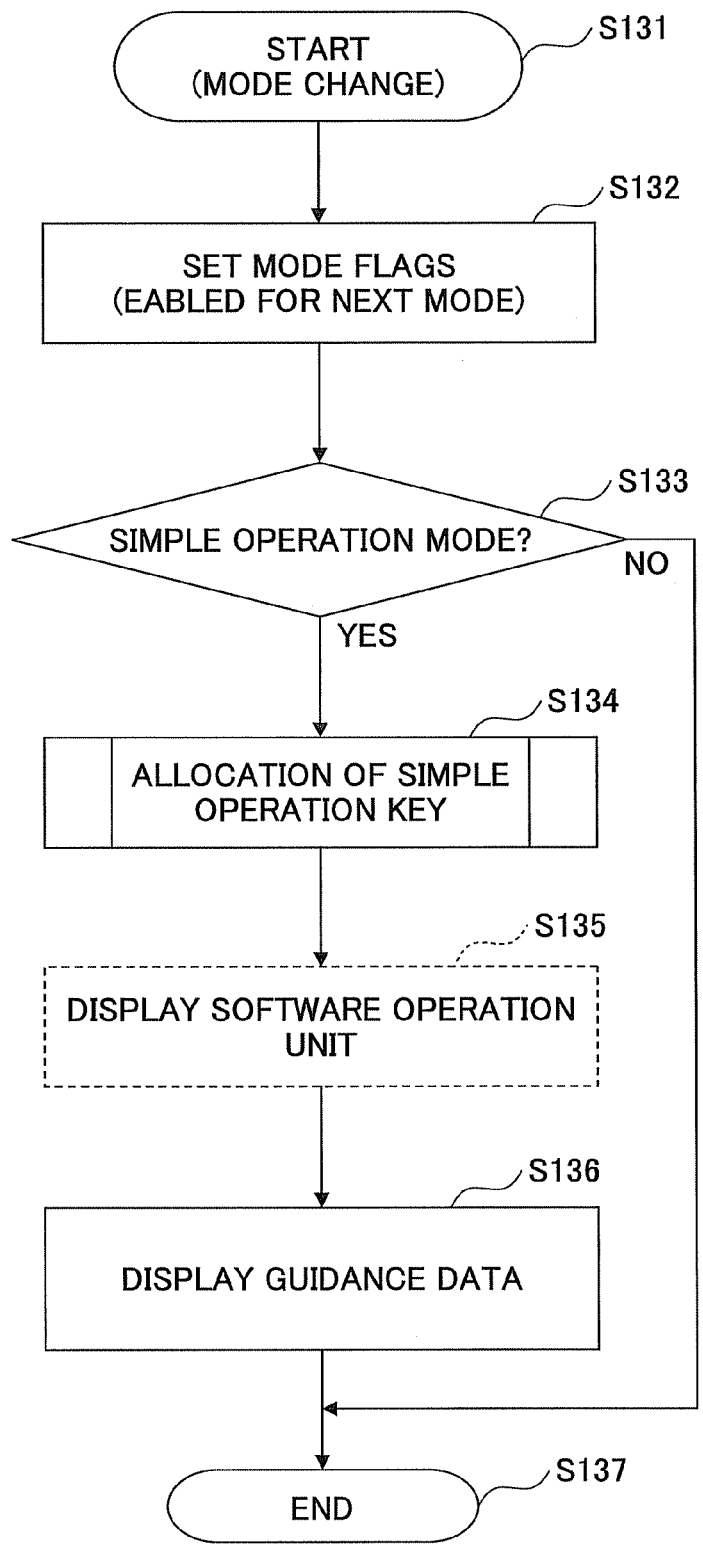
FIG. 12 is a flowchart showing an example of an operation of the electronic display board apparatus when a mode change button is operated.

FIG. 12 is a flowchart showing an example of an operation of the electronic display board apparatus 1 when the mode change button (one of the buttons of the physical operation unit 105, the button of the pen or the like) is operated.

In FIG. 12, when the mode change button is operated, the mode change accepting unit 310 accepts the change and the operation is started (step S131). Then, the mode change accepting unit 310 changes the mode. Specifically, the mode change accepting unit 310 sets "disabled" for the mode flag of the mode which is currently set as "enabled", and sets "enabled" for the mode flag of the next mode which is at the next order in the mode management table storing unit 220

(step S132). When the currently enabled mode is the last mode in the mode management table storing unit 220, the next mode becomes the topmost mode.

Then, the control unit 302 determines whether the enabled mode is changed to the mode "simple operation mode" from a mode other than "simple operation mode" (step S133).

When it is determined that the enabled mode is changed to the "simple operation mode" from a mode other than the "simple operation mode" (YES of step S133), the key allocating unit 312 and the image analyzing unit 314 perform allocation of the simple operation key (step S134). The allocation of the simple operation key is explained later in detail.

Then, when it is determined to display the software operation unit 140 (for example, when the physical operation unit 105 is only provided at one side of the electronic display board apparatus 1, designated by an initial setting such that the software operation unit 140 is to be displayed on the touch panel 107a or the like), the control unit 302 displays the software operation unit 140 to which the operational functions are allocated, respectively, on the touch panel 107a as shown in FIG. 13 (step S135).

Referring back to FIG. 12, then, the key allocating unit 312 displays guidance data such as the application name, functional operation names or the like on the touch panel 107a in the vicinity of the simple operation keys (the physical operation unit 105a and 105b, the software operation unit 140 or the like) to which the operational functions are allocated (step S136). Then, the operation is finished (step S137).

Figure 14:
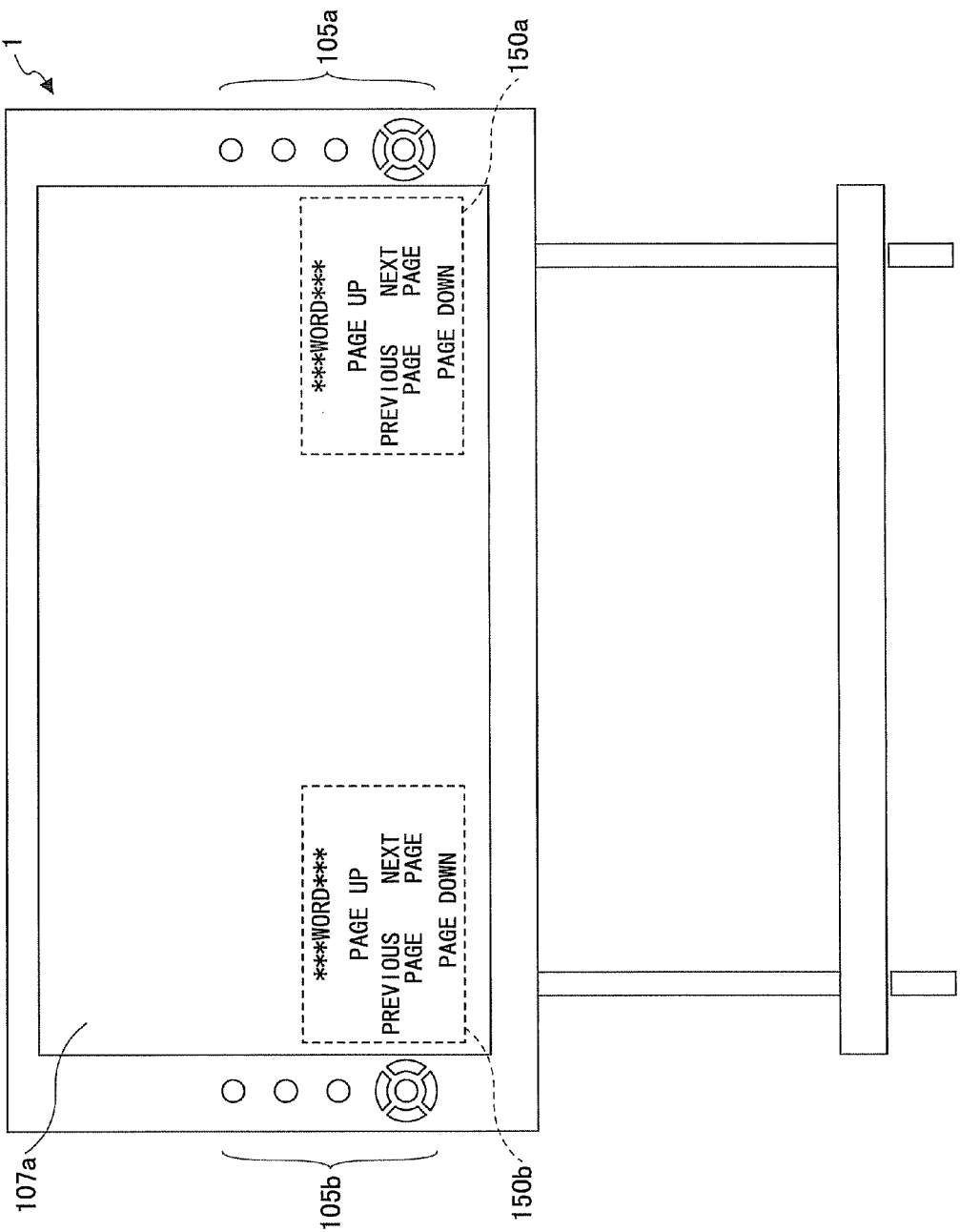
FIG. 14 is a schematic view showing an example of an appearance of the electronic display board apparatus with guidance data.

FIG. 14 is a view showing an example where guidance data 150a and 150b are displayed on the touch panel 107a. The guidance data 150a and 150b include the application name and the functional operation names which are allocated to the physical operation units 105a and 105b, respectively.

Figure 15:
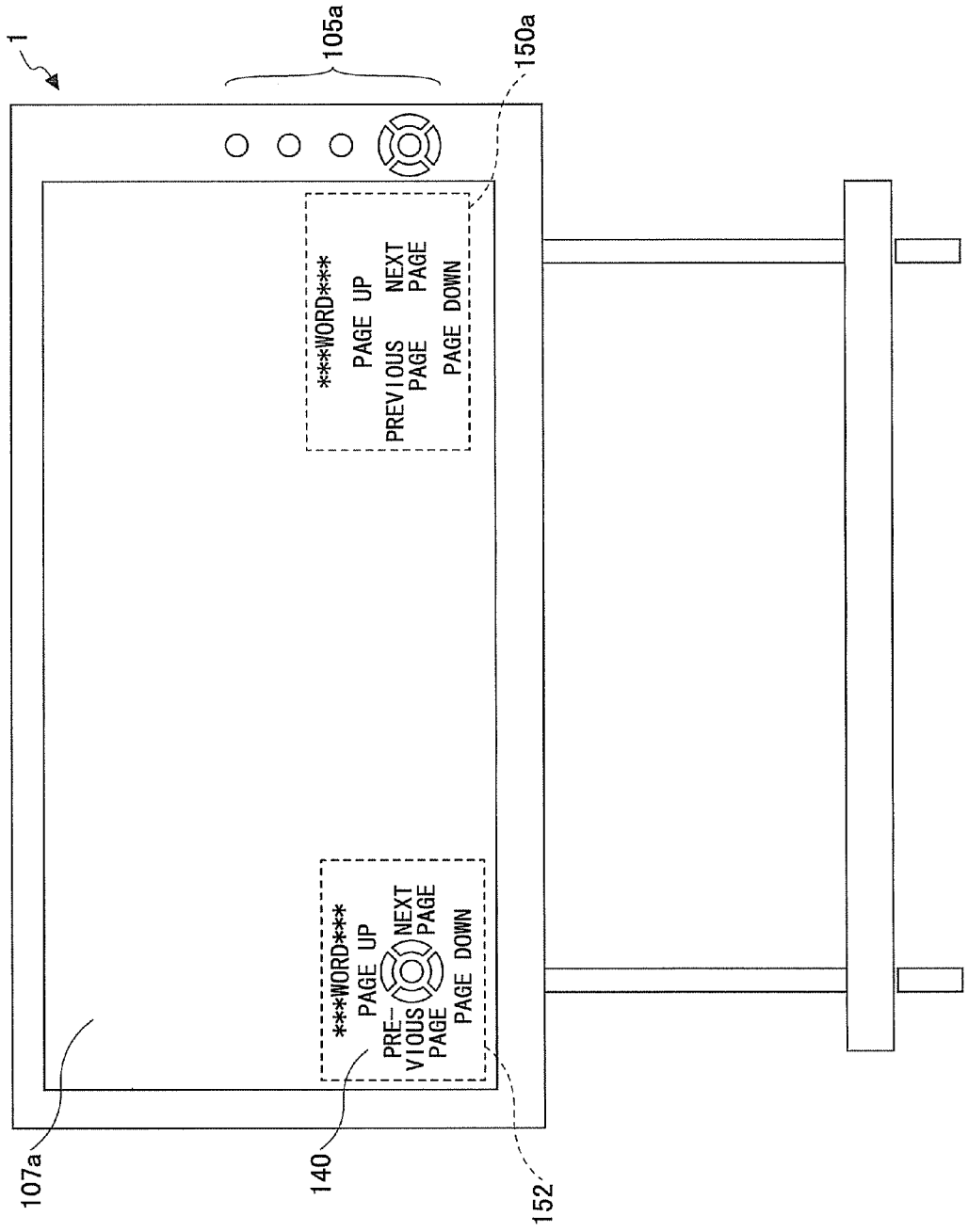
FIG. 15 is a schematic view showing an example of an appearance of the electronic display board apparatus with a software operation unit and guidance data.

FIG. 15 is a view showing an example where the guidance data 150a and guidance data 152 are displayed on the touch panel 107a. In this example, the software operation unit 140 is displayed at one side of the touch panel 107a. At this time, the guidance data 152 may be displayed in combination with the software operation unit 140.

In FIG. 14 and FIG. 15, the guidance data are displayed on both sides of the touch panel 107a in the vicinity of the physical operation units 105a and 105b or the physical operation unit 105a and the software operation unit 140, respectively. However, the guidance data may be displayed only at one of the sides in accordance with the initial setting or the like. At this time, the position of the operator (presenter) is detected and the guidance data may be displayed only at the side where the operator is positioned. The position of the operator may be determined based on which side of the simply operation keys is pushed, for example. Alternatively, the position of the user may be detected by a human sensor or the like using far infrared radiation.

The operation of the allocation of the simple operation is explained.

Figure 16:
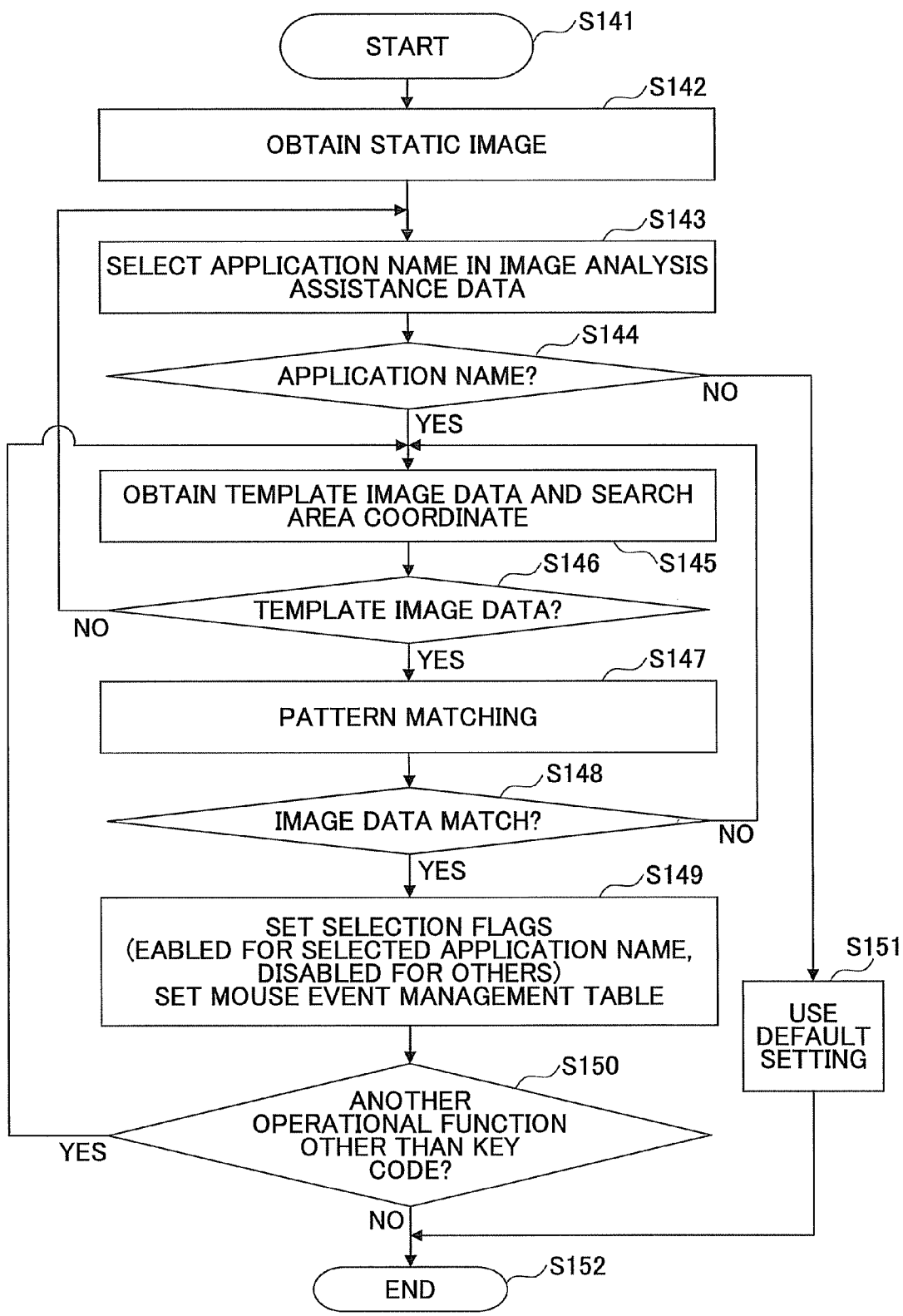
FIG. 16 is a flowchart showing an example of an operation of the electronic display board apparatus when allocating a simple operation key.

FIG. 16 is a flowchart showing an example of an operation of the allocation of the simple operation key of step S134 in FIG. 12 in detail.

First, the kind of the application of an image which is sent from the terminal device 2 and displayed on the touch panel 107a of the electronic display board apparatus 1 is determined.

When the operation of the allocation of the simple operation key is started (step S141), the image analyzing unit 314 obtains the image of the application which is sent from the terminal device 2 and displayed on the touch panel 107a as a static image (step S142).

Then, the image analyzing unit 314 refers to the image analysis assistance data storing unit 228 (see FIG. 7) and selects one of the application names from the image analysis assistance data storing unit 228 (step S143). At this time, the topmost application name may be selected for the first time, and then the next application name may be selected next time, for example.

When one of the application names is selected (YES in step S144), the image analyzing unit 314 obtains one of the sets of the template image data and the search area coordinate of the selected application name (step S145). At this time, the template image data of the specific mark may be selected first to determine the kind of application of the static image.

When the set of the template image data and the search area coordinate of the selected application name is obtained (YES of step S146), the image analyzing unit 314 performs a pattern matching for determining whether image data corresponding to the template image data exists at the corresponding search area designated by the search area coordinate in the static image (step S147).

Specifically, the image analyzing unit 314 moves a standard position (a left and upper edge or the like) pixel by pixel within the search area designated by the search area coordinate in the static image to detect the image data which matches the template image data.

Here, when the search area coordinate is not provided, the image analyzing unit 314 may search the area in the static image from the upper end side, the lower end side, the left end side, and the right end side, in this order, for example.

Then, the image analyzing unit 314 determines whether the image data corresponding to the template image data exists in the static image (step S148).

When the image data corresponding to the template image data exists in the static image (YES of step S148), the key allocating unit 312 sets "enabled" for the selection flag of the selected application name, and sets "disabled" for the selection flags of other application names in the key-functional operation allocation management table storing unit 222 (see FIG. 6).

Further, when the image analyzing unit 314 determines that image data of the operational mark (other than the key codes) associated with a functional operation corresponding to the template image data is included, the key allocating unit 312 obtains the corresponding operational function associated with the detected operational mark. Then, the image analyzing unit 314 stores the functional operation, the point coordinate of the operational mark, and the kind of action in correspondence with each other in the mouse event management table storing unit 230 (see FIG. 8) (step S149).

Then, the key allocating unit 312 refers to the key-functional operation allocation management table storing unit 222 and determines whether another operational function other than the key code is registered for the corresponding application name (step S150).

When it is determined that another operational function other than the key code is registered for the corresponding application name (YES of step S150), the operation moves back to step S145 and the image analyzing unit 314 obtains the next set of the template image data and the search area coordinate of the selected application name (step S145).

When it is determined that another operational function other than the key code is not registered for the corresponding application name (NO of step S150), the operation is finished (step S152).

Further, in step S146, when there is no other remaining set of the template image data and the search area coordinate of the selected application name (NO of step S146), the operation moves back to step S143 and the next application name is selected (step S143).

In step S148, when the image data corresponding to the template image data does not exist in the static image (NO of step S148), the operation moves back to step S145 and the image analyzing unit 314 obtains the next set of the template image data and the search area coordinate of the selected application name (step S145).

Further, in step S144, when it is determined that there is no application name in the image analysis assistance data (YES of step S144), the key allocating unit 312 determines to use a default setting, or a previous setting of the key-functional operation allocation management table storing unit 222 and the mouse event management table storing unit 230 is used (step S151), and ends the operation (step S152).

Alternatively, the kind of application of the static image which is displayed on the touch panel 107a may be determined based on other information such as an extension of the application sent from the terminal device 2.

Alternatively, when the kind of the application is determined, the key allocating unit 312 may refer to the key-functional operation allocation management table storing unit 222 and determine whether the mouse event exists for the respective application first. Then, only when it is determined that the mouse event exists, the above pattern matching operation may be performed.

Figure 17:
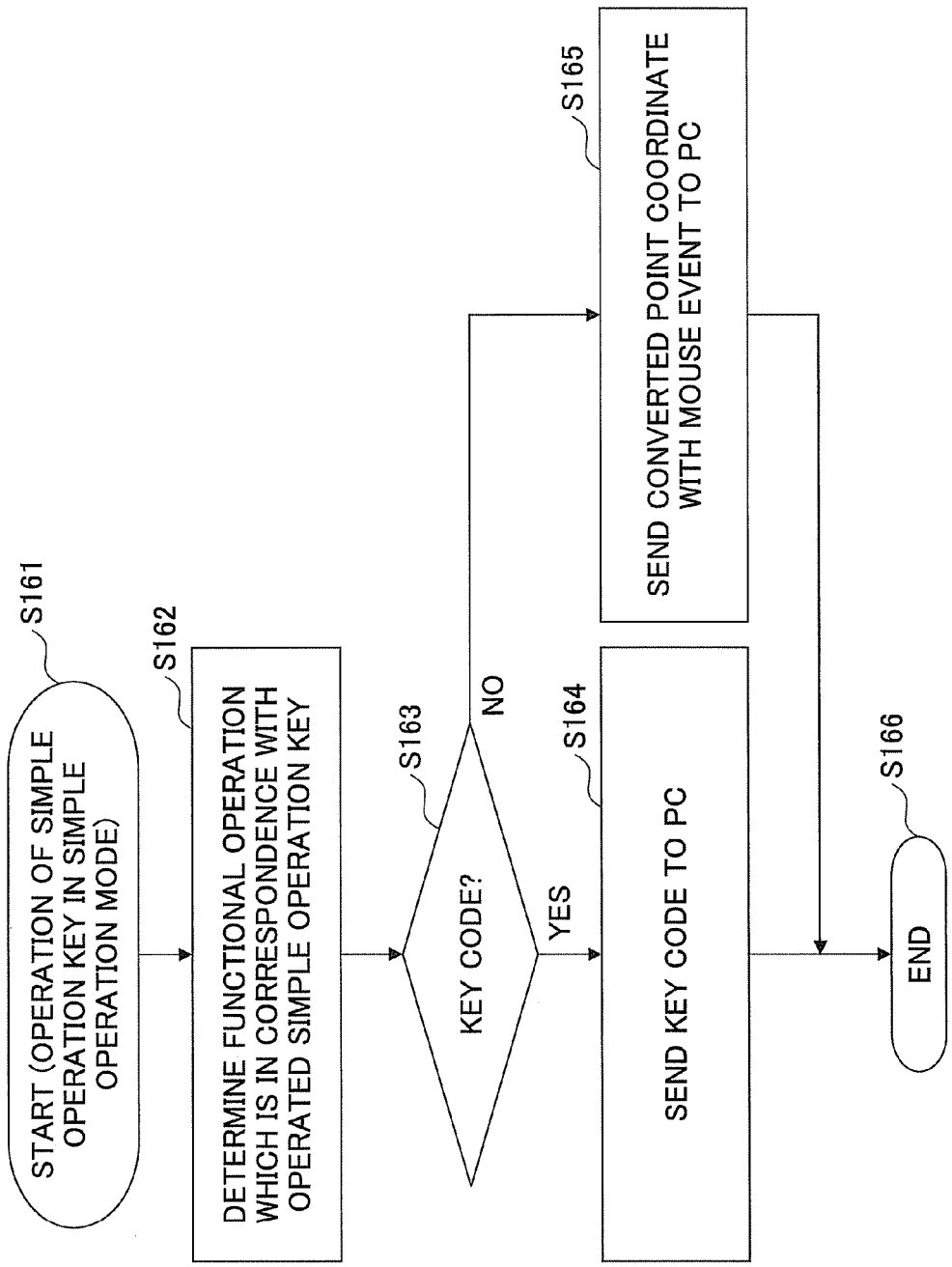
FIG. 17 is a flowchart showing an example of an operation of the electronic display board apparatus when the simple operation keys are operated in the simple operation mode.

FIG. 17 is a flowchart showing an example of the electronic display board apparatus 1 when the simple operation keys are operated in the simple operation mode.

In FIG. 17, when the control unit 302 detects that the simple operation key is operated in the simple operation mode (step S161), the key allocating unit 312 refers to the key management table storing unit 224 and the key-functional operation allocation management table storing unit 222 and specifies the functional operation of the application name for which the selection flag is set as "enabled" associated with the operated simple operation key (via the key allocation number) (step S162).

Specifically, when the push button 126c is operated (see FIG. 2), the key allocating unit 312 refers to the key management table storing unit 224 as shown in FIG. 5A. As the push button 126c is allocated to the key allocation #2, the key allocating unit 312 refers to the key-functional operation allocation management table storing unit 222 and specifies the operational function "page down" (key code) which is in correspondence with the key allocation #2 of the application name "power point" for which the selection flag is set as "enabled".

Then, the key allocating unit 312 determines whether the specified functional operation is a key code (step S163).

When it is determined that the specified functional operation is the key code (YES of step S163), the key allocating unit 312 sends the key code itself to the terminal device 2 (step S164), and the operation is finished (step S166).

With this operation, in the terminal device 2, an operation the same as when the key code is input is performed.

On the other hand, when it is determined that the specified functional operation is not the key code (NO of step S163), the key allocating unit 312 refers to the mouse event management table storing unit 230 and obtains the point coordinate and the mouse event of the corresponding operational function name. Then, the key allocating unit 312 converts the obtained point coordinate to that of the terminal device 2, and sends the converted point coordinate with the mouse event to the terminal device 2 (step S165), and the operation is finished (step S166).

With this operation, in the terminal device 2, an operation same as when the sent coordinate is touched or clicked is performed.

Figure 18:
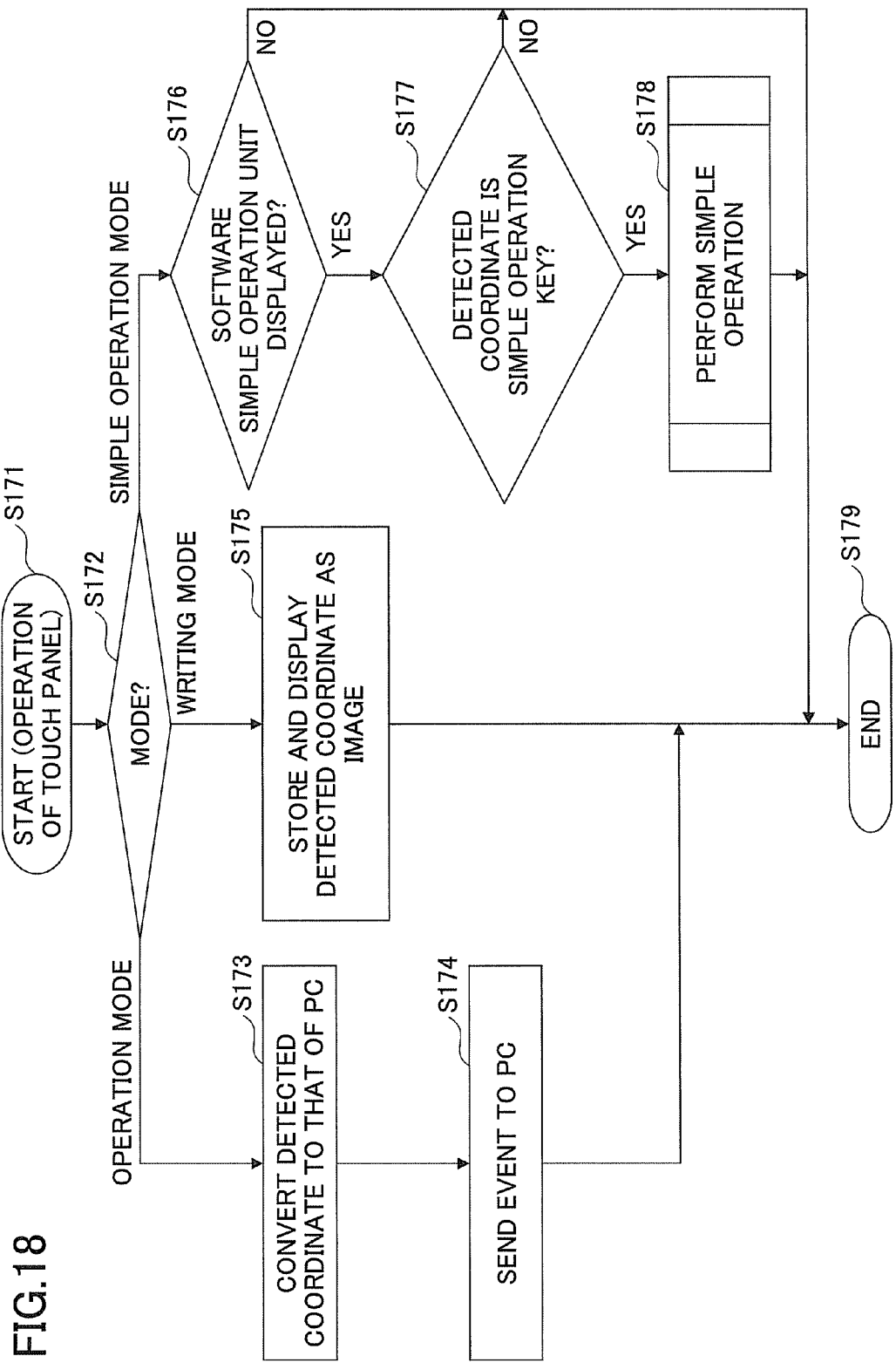
FIG. 18 is a flowchart showing an example of an operation of the electronic display board apparatus when a touch panel is operated.

FIG. 18 is a flowchart showing an operation of the coordinate detection unit 108 when the touch panel 107a is operated.

When the touch panel 107a is touched or contacted (step S171), the touch panel control unit 316 detects the touched coordinate and notifies to the control unit 302. Then, the control unit 302 refers to the mode management table storing unit 220, and determines the current mode (step S172).

When it is the "operation mode", the control unit 302 converts the detected coordinate of the touch panel 107a to that of the terminal device 2 (step S173), and sends the converted coordinate to the terminal device 2 with mouse event data indicating the action of the touch (mouse down, single click, double click or the like) in accordance with the action of the operator (kept touched, a single touch, double touches, or the like) (step S174), and the operation is finished (step S179).

When it is the "writing mode", the control unit 302 inputs the detected coordinates of the touch panel as image data and stores them (step S175), and the operation is finished (step S179). The stored image data may be displayed on the display 107 (touch panel 107a).

On the other hand, when it is the "simple operation mode", the control unit 302 (key allocating unit 312) determines whether the software operation unit 140 is displayed as the simple operation key on the touch panel 107a (step S176).

When it is determined that the software operation unit 140 is displayed (YES of step S176), the touch panel control unit 316 determines whether the detected coordinate of the touch panel 107a is within the area where the software operation unit 140 is displayed based on the detected coordinate and the key management table storing unit 224 (FIG. 5B) (step S177).

When it is determined that the detected coordinate of the touch panel 107a is the area where the software operation unit 140 is displayed (YES of step S177), the operation is processed as the operation of the simple operation key and the operation as explained above with reference to FIG. 17 is performed (step S178). Then, the operation is finished (step S179).

When it is determined that the software operation unit 140 is not displayed (NO of step S176), or when it is determined that the detected coordinate of the touch panel 107a is not the area where the software operation unit 140 is displayed (NO of step S177), no process is performed and the operation is finished (step S179). It means that the touch panel control unit 316 suppresses the touch panel function of the touch panel 107a other than the area where the software operation unit 140 is displayed in the simple operation mode. With this operation, even if the operator touches the touch panel 107a in an area other than where the software operation unit 140 is displayed, the operation is not sent to the terminal device 2 to reduce the error in operation.

Further, instead of providing the physical operation key allocation management table shown in FIG. 5A, the "physical operation key name" may be directly corresponded with the operational functions in the key-functional operation allocation management table shown in FIG. 6.

According to the electronic display board apparatus 1 of the embodiment, it is possible to operate the minimum operation in accordance with a displayed application while preventing operational errors without performing a setting in the terminal device 2 which is connected to the electronic display board apparatus 1.

The individual constituents of the electronic display board apparatus 1 may be embodied by arbitrary combinations of hardware and software, typified by a CPU of an arbitrary computer, memory, a program loaded in the memory so as to embody the constituents illustrated in the drawings, storage units for storing the program such as a hard disk, and an interface for network connection. It may be understood by those skilled in the art that methods and devices for the embodiment allow various modifications.

Although a preferred embodiment of the electronic display board apparatus has been specifically illustrated and described, it is to be understood that minor modifications may be made therein without departing from the spirit and scope of the invention as defined by the claims.

The present invention is not limited to the specifically disclosed embodiments, and variations and modifications may be made without departing from the scope of the present invention.

The present application is based on Japanese Priority Application No. 2011-274736 filed on Dec. 15, 2011, the entire contents of which are hereby incorporated by reference.

What is claimed is:

1. An electronic display board apparatus configured to provide an operation key, comprising:
   a display with a touch panel function on which an application image is displayed;
   a mode change accepting unit which accepts an operation mode for the touch panel function, the operation mode including a simple operation mode;
   an image analyzing unit which detects an operational image associated with an operational function from the application image displayed on the display at the simple operation mode;
   a key allocation unit which allocates the operation key to the operational image detected by the image analyzing unit so that an operation of the allocated operation key is treated as an operation to the operational image at the simple operation mode; and
   a touch panel control unit which suppresses the touch panel function of at least a part where the operational image is displayed at the simple operation mode.

2. The electronic display board apparatus according to claim 1,
   wherein the operation key is a physical key provided on the electronic display board apparatus.

3. The electronic display board apparatus according to claim 1,
   wherein the operation key is a software key displayed on the display.

4. The electronic display board apparatus according to claim 3,
   wherein the touch panel control unit suppresses the touch panel function of a part of the display other than a part where the software key is displayed.

5. The electronic display board apparatus according to claim 1,
   wherein the touch panel control unit suppresses the touch panel function of at least a part of the display where the application image is displayed.

6. A method of controlling an electronic display board apparatus configured to provide an operation key and including a display with a touch panel function on which an application image is displayed, comprising:
   accepting an operation mode for the touch panel function, the operation mode including a simple operation mode;
   detecting an operational image associated with an operational function from the application image displayed on the display at the simple operation mode;
   allocating the operation key to the detected operational image at the simple operation mode; and
   suppressing the touch panel function of at least a part where the operational image is displayed at the simple operation mode; and
   treating an operation of the allocated operation key as an operation to the operational image at the simple operation mode.

7. The method of controlling the electronic display board apparatus display board according to claim 6,
   wherein the operation key is a physical key provided on the electronic display board apparatus.

8. The method of controlling the electronic display board apparatus display board according to claim 6, further comprising:
   displaying a software key on the display as the operation key.

9. An electronic display board apparatus control system for controlling an electronic display board apparatus configured to provide an operation key and including a display with a touch panel function on which an application image is displayed, comprising:
   a mode change accepting unit which accepts an operation mode for the touch panel function, the operation mode including a simple operation mode;
   an image analyzing unit which detects an operational image associated with an operational function from the application image displayed on the display at the simple operation mode;
   a key allocation unit which allocates the operation key to the operational image detected by the image analyzing unit so that an operation of the allocated operation key is treated as an operation to the operational image at the simple operation mode; and
   a touch panel control unit which suppresses the touch panel function of at least a part where the operational image is displayed at the simple operation mode.

10. The electronic display board apparatus control system according to claim 9,
    wherein the operation key is a physical key provided on the electronic display board apparatus.

11. The electronic display board apparatus control system according to claim 9,
    wherein the operation key is a software key displayed on the display.

12. The electronic display board apparatus control system according to claim 11,
    wherein the touch panel control unit suppresses the touch panel function of a part of the display other than a part where the software key is displayed.

13. The electronic display board apparatus according to claim 9,
    wherein the touch panel control unit suppresses the touch panel function of at least a part of the display where the application image is displayed.

* * * * *